United States Patent

Bergemann et al.

[15] 3,659,496
[45] May 2, 1972

[54] MACHINE FOR SHAPING GEARS

[72] Inventors: Werner E. Bergemann; Ernst J. Hunkeler; Harry Pedersen, all of Rochester, N.Y.

[73] Assignee: The Gleason Works, Rochester, N.Y.

[22] Filed: Mar. 13, 1970

[21] Appl. No.: 19,346

[52] U.S. Cl. ................................................ 90/8, 90/7, 90/10
[51] Int. Cl. ........................................................ B23f 5/14
[58] Field of Search ................................................ 90/8, 7, 2

[56] References Cited

UNITED STATES PATENTS

| | | | |
|---|---|---|---|
| 1,922,756 | 8/1933 | Candee | 90/7 |
| 2,589,759 | 3/1952 | Zamis | 90/8 |
| 3,096,685 | 7/1963 | Demuth | 90/2 |
| 2,856,823 | 10/1958 | Knuttel | 90/2 |
| 1,177,503 | 3/1916 | Fellows | 90/7 |
| 2,628,538 | 2/1953 | Miller | 90/8 |

Primary Examiner—Gil Weidenfeld
Attorney—Morton A. Polster and Cushman, Darby & Cushman

[57] ABSTRACT

A gear shaping machine for cutting gears with generation effected by a rotatable work holder and a tool holder carrying a cutting tool adapted to be reciprocated. The tool holder is mounted to a translatable supporting structure, the rate or speed of such translational movement during generation being selectively variable to produce variable ratio gears. Separate and independent power sources are provided for the generating train, for actuating the cutting tool, and for a servo mechanism which controls the reversing operation of the generating train. The tool holder is slidably mounted in a cradle housing for movement in a direction along its own axis (and at right angles to said translational movement) to permit production of an oversized tooth or teeth in the gear or gear sector being cut. Means are also provided to effect insertion and withdrawal of the cutting tool relative to the work for each individual cutting stroke. A counterweight mechanism is provided in operative connection to the structure for reciprocating the cutting tool to provide a smoother and faster cutting stroke.

20 Claims, 10 Drawing Figures

Patented May 2, 1972

INVENTORS
WERNER E. BERGEMANN
ERNST J. HUNKELER
HARRY PEDERSEN
BY Cushman, Darby & Cushman
ATTORNEYS INVENTORS
WERNER E. BERGEMANN
ERNST J. HUNKELER
HARRY PEDERSEN
BY Cushman, Darby & Cushman
ATTORNEYS

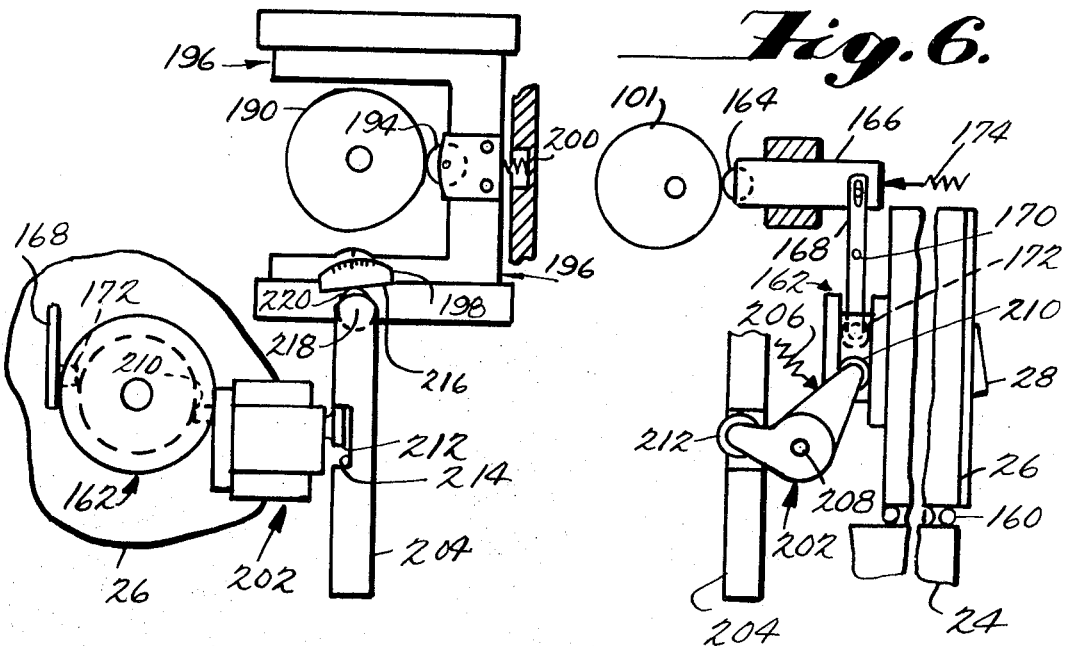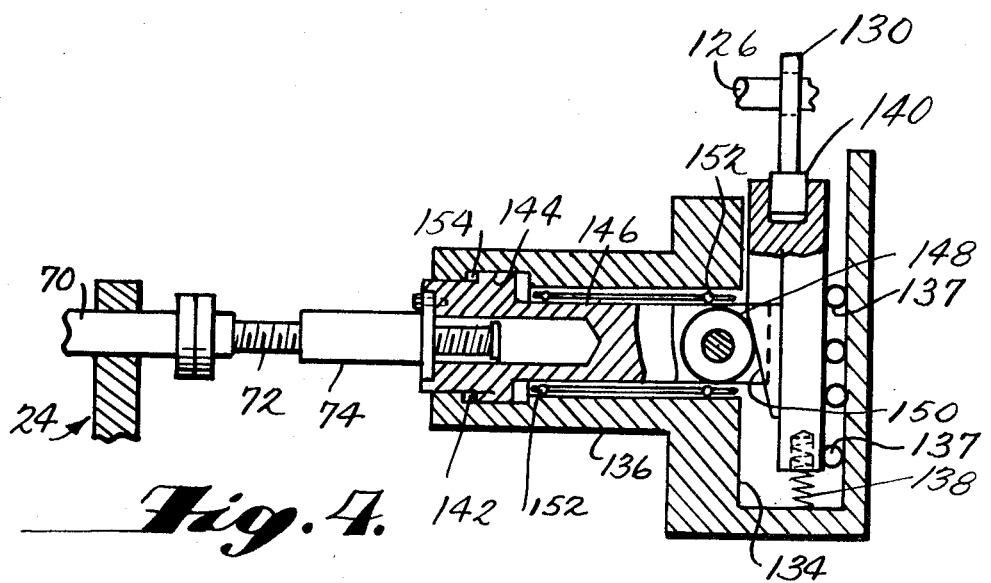

Patented May 2, 1972

INVENTORS
WERNER E. BERGEMANN
ERNST J. HUNKELER
HARRY PEDERSEN
BY Cushman, Darby & Cushman
ATTORNEYS Patented May 2, 1972

INVENTORS
WERNER E. BERGEMANN
ERNST J. HUNKELER
HARRY PEDERSEN

BY Cushman, Darby & Cushman
ATTORNEYS 3,659,496

MACHINE FOR SHAPING GEARS

BACKGROUND AND OBJECTS

This invention relates to gear shaping machines wherein the cutting tool is in the form of a rack adapted to be reciprocated during the cutting action and wherein there is generation or a generating roll between the tool and the work during the cutting cycle. As will be understood, the rack-type cutter is provided with cutting edges at the end of each tooth therein with clearance along the sides.

A primary object of the present invention is to provide a novel gear shaping machine, of the character described, adapted to operate satisfactorily at high cutting speeds without any undesirable vibration or noise and also adapted to cut uniform or non-uniform teeth on the workpiece, as desired.

A further object of the invention resides in a novel combination of structures in a gear shaping machine, of the character under consideration, wherein the cutter or tool will be bodily translated in a direction generally perpendicular to the direction of the reciprocating cutting stroke and with means being provided for varying the rate of translational movement of the tool during generation, if desired, so as to produce non-uniform teeth in the workpiece.

Another object of the invention is to provide a novel structural combination of parts in gear shaping machines, of the type under consideration, providing a sturdy and robust construction adapted to withstand high speed operations. More specifically, the illustrative embodiment of the present invention contemplates the provision of a relatively large cradle housing slidably mounted on a base member, with a tool carrying cradle adjustably and slidably mounted in the cradle housing and with a work holder assembly movably mounted on the base member and all of a construction similar to the base member, cradle housing, cradle and work holder assembly of the gear making machines disclosed in the commonly assigned copending patent applications, Ser. Nos. 764,213, 764,214, 764,217, 764,221 and 764,222, all filed on Oct. 1, 1968. In a sense, the present invention contemplates an adaptation of certain features of the bevel gear making machines disclosed in those patent applications to the cutting of gears or gear sectors with a reciprocating rack-type cutter as distinguished from the rotating, circular, face mill cutters utilized on those bevel gear making machines. Also, it is contemplated that automatic work loading and unloading structures, such as disclosed in the commonly assigned patent application, Ser. No. 764,219, filed on Oct. 1, 1968, may also be used in machines of the present invention, as will be evident.

A further objective of the present invention is to adapt the generating train disclosed in the aforesaid copending applications, Ser. Nos. 764,213 and 764,214 for use in gear shaping machines, of the character under consideration, wherein the generating train will be operatively connected to the work spindle and also to the cradle housing (instead of the cradle) to effect an adjustable, predeterminable rate of generation or ratio of generating roll therebetween. Thus, the cradle housing in the present invention will be moved bodily to effect the generating translational movement of the cutter or tool, whereas in the machines of the aforesaid pending applications the cradle was rotated to effect the generating motion for the cutter.

Further and related objects reside in the adaptation of the generating train control mechanism of copending application, Ser. No. 764,213 for use in gear shaping machines of the type under consideration, whereby the generating train may operate at relatively high speeds and is reversible, and further whereby other advantages of that generating train control mechanism may be available for gear shaping operations in machines of the present invention.

In connection with providing for high speed operation, it is a still further objective of the present invention that novel structure be provided for mounting the cutter or tool for high speed reciprocation with minimum vibration and for otherwise facilitating and improving the cutting action of the tool. A related object resides in the provision of novel means providing for a most optimum cutting path for the tool.

A still further object resides in the provision of novel structure adapting the gear shaping machine of the present invention to cut an oversize tooth or teeth on the workpiece, as desired. Such structure, in the illustrative embodiment of the invention, is conveniently operatively connected to the cradle and to the drive train of the means for varying the rate of translational movement of the cradle housing. Such structure further includes means providing for variation in the amount of tooth oversize, as desired.

Further objectives reside in the particular combinations, subcombinations and structures disclosed herein providing gear shaping machines of exceptional versatility and sturdiness, requiring minimum supervision and capable of operating satisfactorily at high speeds to produce workpieces over a wide range of sizes having uniform or non-uniform teeth, as desired, and adapted to produce an oversize tooth or teeth, if desired.

Further objects and advantages of the invention will be in part obvious and in part pointed out hereinafter.

The novel features of the invention may best be made clear from the following description and accompanying drawings in which:

DESCRIPTION OF THE DRAWINGS

FIG. 4 is an enlarged schematic and partially sectioned fragmentary view of an exemplary structure employed in connection with varying the rate of translational movement of the cradle housing, cradle and cutting tool carried thereby;

FIG. 5 is an enlarged and fragmentary rear elevational view of the cradle and exemplary structures for effecting axial movement thereof;

FIG. 6 is a fragmentary side elevational view of the cradle and structure as shown in FIG. 5;

DETAILED DESCRIPTION OF THE ILLUSTRATIVE EMBODIMENTS OF THE INVENTION

Figure 1:
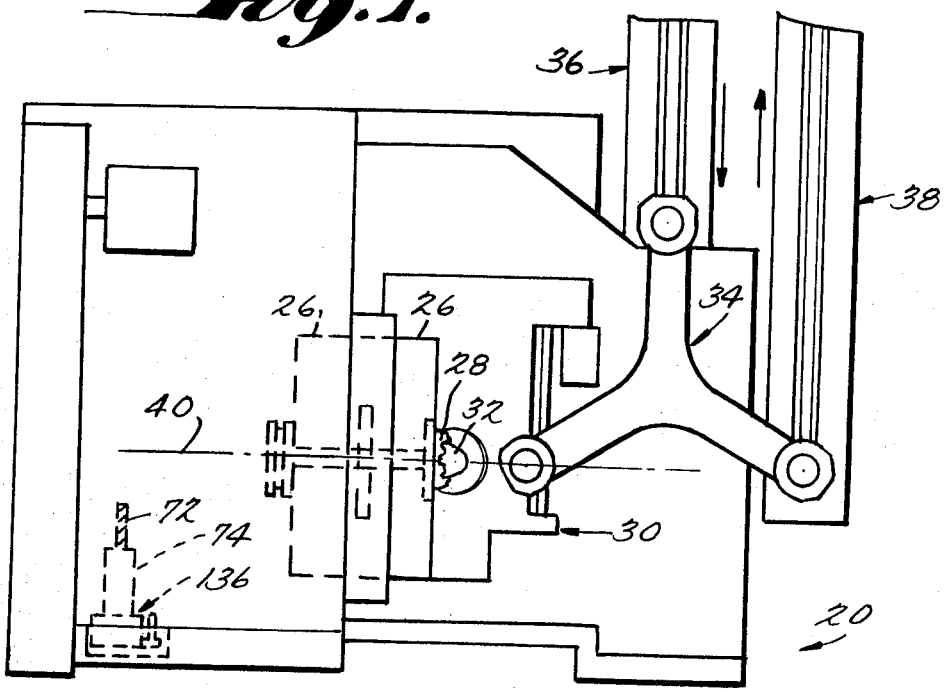
FIG. 1 is a schematic top plan view of a gear shaping machine embodying the invention and with certain parts and structure omitted for convenience of illustration.
Figure 2:
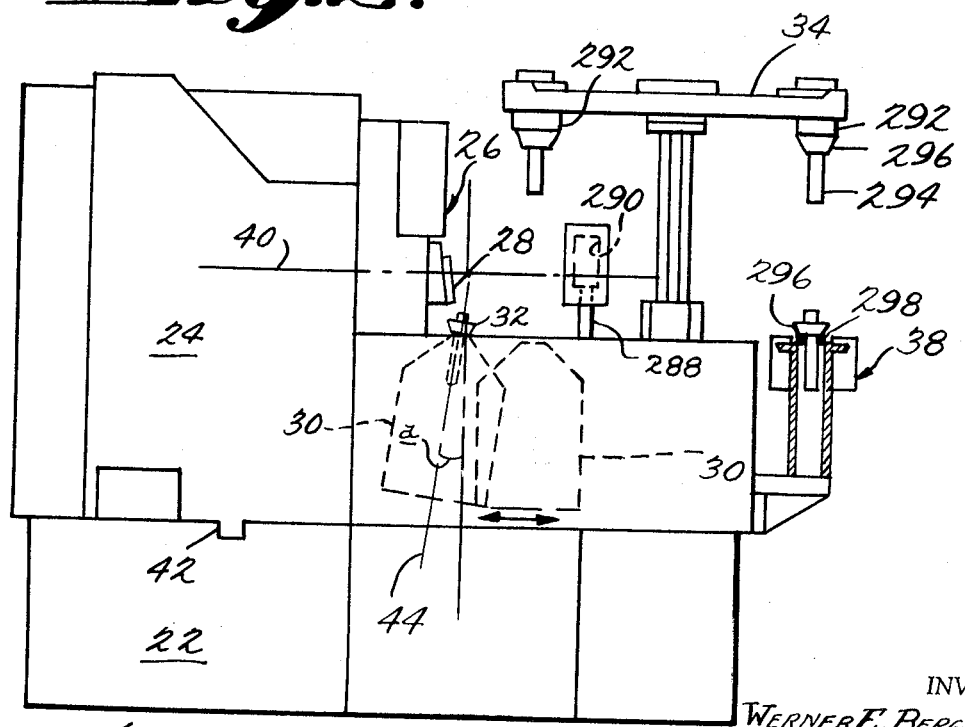
FIG. 2 is a side elevational view of the machine shown in FIG. 1 and with the work head assembly shown in dotted lines in two different positions, the one on the right constituting an exemplary work loading and unloading position and the other (on the left) constituting an exemplary operative or cutting position.

Referring now to the drawings, and in particular, the FIGS. 1 and 2, an exemplary gear shaping machine 20 embodying the invention is shown as including a base 22, a cradle housing 24, a cradle or tool holder 26, a cutting tool 28 carried by the cradle, a work head assembly 30, a workpiece 32, a work loading and unloading turret 34, and work feed 36 and discharge 38 conveyor means. It will be appreciated that the gear shaping machine 20, as described herein, is somewhat similar in engineering design and sturdiness to the bevel gear making machines and structures therefor disclosed in the aforementioned patent applications. Accordingly, for convenience, members 24 and 26 have been designated herein as "cradle housing" and "cradle" respectively, since such designation is conventional for corresponding structures in the bevel gear making machines referred to. The movements of member or tool holder 26, as will be described hereinbelow, include a bodily movement thereof along its own axis 40 and relative to housing 24, as well as a movement with the housing when the latter is translated, as during generation. Thus, rotation of the member 26 about its own axis is not necessary in the present invention.

It will be further appreciated from a consideration of the disclosures of the aforementioned pending applications that the present invention, in part, is an adaption of certain features and structures of those inventions designed to provide a gear shaping machine wherein the cutting tool will be reciprocated back and forth to define the cutting stroke, and wherein the cradle housing will be bodily translated to provide the generating motion for the cutting tool. In the bevel gear generators of the copending applications referred to above, the cutting tool is illustrated as an annular or circular face mill cutter that rotates about its own axis during cutting, whereas in the present invention, the cutting tool is in the shape of a rack carried by the cradle for reciprocation relative thereto.

In view of the adaptation of certain features and structures disclosed in the aforesaid copending applications, in developing the exemplary embodiments of the present invention, the disclosures of those applications are incorporated herein by reference so that it will not be necessary to set forth herein a full and complete explanation of those features. Accordingly, the present application will contain only so much of a disclosure of features or structures in common with those disclosed in those copending applications as will be necessary for an understanding of the present invention.

The tool 28 is shown in FIG. 1 as being in the form of a rack, and it is adapted to be reciprocated vertically relative to the cradle 26 by structure to be described in more detail hereinbelow. The cradle or tool holder 26 is shown as being of generally cylindrical or barrel shape having a horizontal axis 40 and suitably arranged within the cradle housing 24 for bodily movement along its axis 40, as will be referred to again hereinbelow. The cradle housing 24, itself, is movable bodily and horizontally, relative to base 22, and in a direction at right angles to the cradle axis 40 by structure to be referred to hereinbelow. Suitable structure is provided permitting the cradle housing 24 to move bodily relative to the machine base 22, and such structure is indicated schematically in FIG. 2 by numeral 42 as a tongue and groove construction.

Thus, it will be seen that the tool 28 has several basic motions. It reciprocates vertically relative to the cradle 26. It moves bodily with the cradle along the axis 40 of the cradle when the latter is moved relative to the cradle housing 24. It also moves bodily with the cradle and cradle housing when the latter translates or moves horizontally at right angles to the cradle axis 40. And there is a further bodily motion of the tool in and out relative to the cradle in connection with each cutting stroke, as will be described hereinbelow.

The work head assembly 30 is shown as being of the type disclosed in the copending applications, Ser. Nos. 764,212 and 764,221, mentioned above. The workpiece 32 is shown in FIG. 1 as being in the form of a gear sector arranged in operative position just below the tool 28 and with the axis 44 of the workpiece arranged at a slight angle, a, to the vertical, as shown in FIG. 2.

It is contemplated, in the present invention, that during the cutting operation the workpiece 32 rotates about its own axis 44 while the tool 28 is both reciprocated up and down and translated bodily (by virtue of the translational movement of the cradle housing 24). Thus, a generating cutting action is provided wherein the generating roll involves a rotation of the workpiece about its own axis (which remains stationary) and bodily translational movement of the tool in a horizontal direction, generally perpendicular to the cradle and work axis. The invention further contemplates means for varying the rate of generating roll between the tool and the workpiece during generation, if desired, and also means providing for the formation of an oversize tooth or teeth on the workpiece, for purposes that will become evident.

The Generating Train

Figure 3:
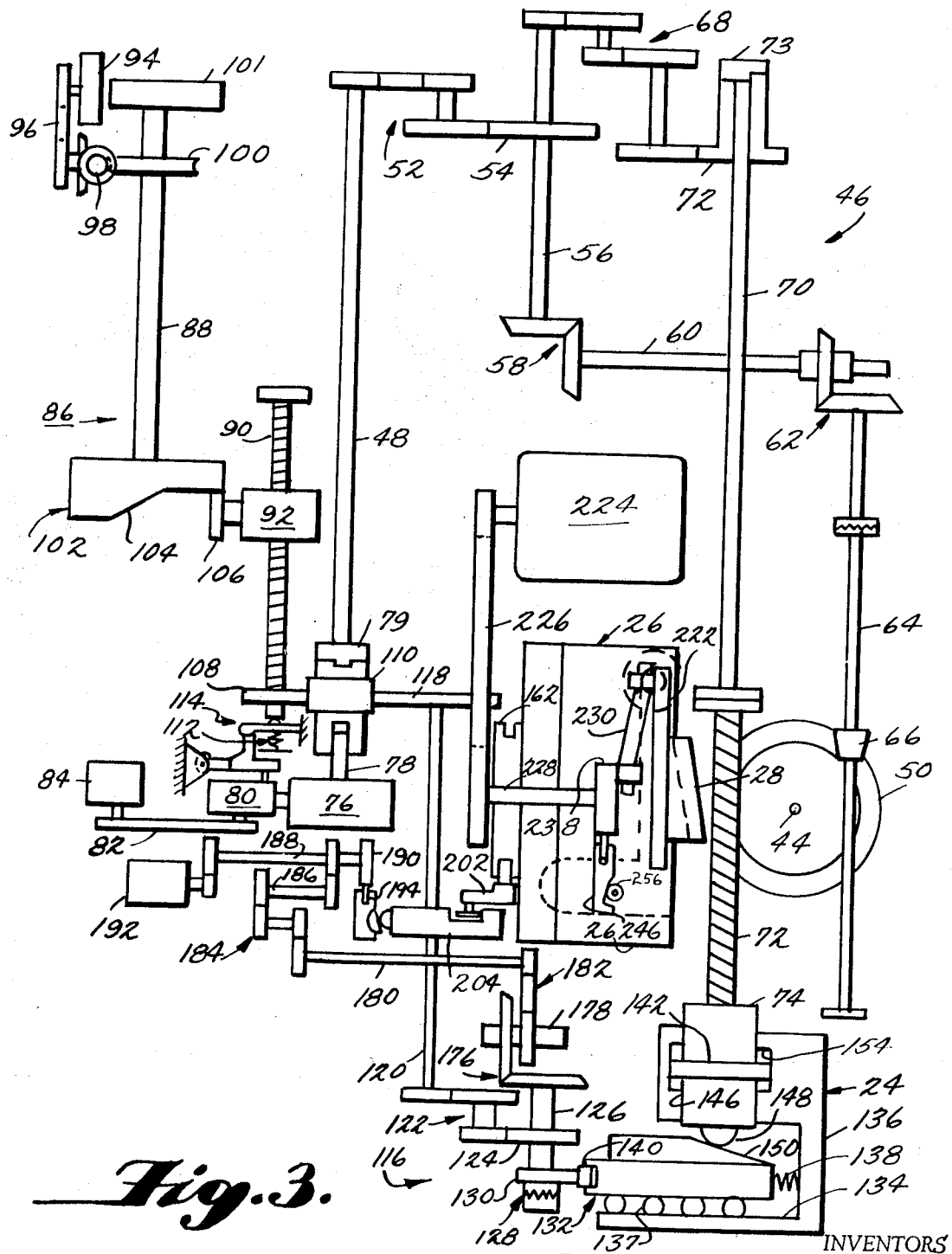
FIG. 3 is a diagrammatic view of an exemplary generating train and associated structures and mechanisms for effecting cutting and generating motions of the cutting tool and work.

To provide for proper generation between workpiece and tool, a generating train 46 is provided, as shown schematically in FIG. 3. It will be appreciated that this generating train is similar in design to the generating train disclosed in the copending applications, Ser. Nos. 764,213 and 764,214, referred to above. As shown, it includes an input shaft 48 connected through suitable gearing and shafts both to a ring gear 50 of the work spindle and to the cradle housing 24.

In the exemplary embodiment shown in FIG. 3, the generating train includes a first set of roll change gears 52 connecting the shaft 48 to a gear 54 on the shaft 56. Shaft 56 is connected through right angle or bevel gearing 58 to shaft 60, the latter in turn being connected through bevel gearing 62 to shaft 64 having a pinion gear 66 thereon in driving engagement with the ring gear 50 carried by the work spindle to rotate the latter about the axis 44 which is also the axis of the workpiece.

Shaft 56 is also shown as being connected through ratio of roll change gearing 68 to shaft 70 through gear 72 and backlash clutch 73. Shaft 70 is coaxially drivingly connected to a lead screw 72 shown in operative threaded engagement to a ball nut 74, the latter being suitably operatively connected to the cradle housing 24 to effect horizontal translational movements thereof, as will be explained more fully hereinbelow.

Thus, reversible rotation of the input shaft 48 of the generating train effects a predeterminable and coordinated generation or generating roll between the workpiece and the tool.

In the exemplary embodiment shown, the input shaft 48 of the generating train is reversibly driven by a reversible hydraulic motor 76 drivingly connected thereto through output shaft 78 and releasable clutch 79. The motor 76 is reversibly driven by a reversible hydraulic pump 80 drivingly connected as by pulleys and belt 82 to a conventional electric motor 84. The operation of the pump 80 is under the control of suitable mechanism designated generally at 86 and similar to the control arrangement disclosed in the copending application, Ser. No. 764,213, referred to above. Conventional valve structures, such as a wobble plate (not shown), may be provided to regulate the output of pump 80 in connection with the control mechanism 86.

The change gearing 52, 68 may be replaced by different gearing, as desired, so as to vary or change the generating motion between the workpiece and the tool, as will be understood by those skilled in the art.

Control Mechanism for the Generating Train

The means for controlling the operation of the generating train 46 is shown as being the same type of mechanism disclosed in the aforesaid copending application, Ser. No. 764,213. Such mechanism designated generally as 86 in schematic FIG. 3, includes a cam shaft 88 and a ball screw 90 and nut 92 assembly operatively connected to the generating train 46 and the pump 80 for controlling the operation of the motor 76, as will be understood. It is not deemed necessary to provide any elaborate description herein of this servo-control mechanism 86 since the same is fully and completely disclosed in the copending application, Ser. No. 764,213. However, it will be noted that this control arrangement includes a variable speed motor 94 drivingly connected through pulleys and a belt 96 to a worm 98 and worm wheel 100 for rotating the cam shaft 88. A feed cam 101 is carried at one end of the cam shaft and this cam is operatively connected through suitable structure to provide for axial infeed and withdrawal of the cradle at the beginning and end of a cutting cycle, as will be referred to again hereinbelow. At the other end of the cam shaft 88 there is provided a control cam 102 whose cam surface 104 is in engagement with a roller 106 operatively carried by the nut 92, as shown.

Bodily movement of the nut 92 and lead screw 90, under the action of the control cam 102, the gears 108, 110, and the continuously biasing spring 112, operates to control the position of the actuator 114 for the valve structure (not shown) within the pump 80, as described in the aforementioned copending application, Ser. No. 764,213.

Thus, it will be seen that all of the advantages and virtues of having such a servo-control mechanism 86 for regulating the operation of the generating train 46, as referred to in the aforementioned copending application, Ser. No. 764,213 are also applicable to machines of the present invention.

Ratio Change Mechanism

An exemplary arrangement of the ratio change mechanism contemplated by the present invention is shown schematically in FIG. 3 and is identified generally by reference numeral 116. As shown, it includes a gear 118 driven off the gear 110 at the input to the generating train. Gear 118 is drivingly connected to a shaft 120 which in turn is connected through variable ratio change gears 122 to gear 124, shaft 126 and clutch 128. The clutch 128 is shown as being of the toothed face clutch-type structure designed to releasably drivingly connect the shaft 126 to a cam 130 arranged for rotation about the axis of shaft 126.

When the clutch 128 is engaged, the cam 130 rotates continuously with the generating train 46 and operates through structure, to be described hereinbelow, to vary the translational generating movement of the tool 28. Basically, the rotation of cam 130 operates, at certain preselected times, to modify or change the effect of rotation of lead screw 72 on movement of cradle housing 24. As best shown in FIGS. 3 and 4, such structure includes a wedge block assembly 132 slidably mounted in a recess or cavity 134 in structure 136 fixed to or carried by the cradle housing 24 and movable therewith. Suitable bearings 137 are indicated schematically in FIGS. 3 and 4 as being provided for the wedge block assembly. Spring means 138 are shown in the cavity 134 for continuously urging the wedge block assembly 132 against the cam 130. A roller 140 is carried by the wedge block assembly and is in rolling contact with the cam 130, as shown.

The ball nut 74 is fixedly connected to a piston 142 as shown in FIG. 4. Piston 142 is disposed within a cylinder 144 in the structure 136 of the cradle housing and has an axial extension or projection 146 thereon carrying a roller 148 in engagement with the inclined surface 150 on the wedge block assembly. Suitable bearing structure 152 is shown as being arranged around the piston rod 146 and fluid pressure is present in the chamber 154, to the left of the piston head 142 as viewed in FIG. 4.

Thus, it will be seen that if the clutch 128 is disengaged so that the cam 130 is not rotating during generation but is held stationary in a fixed position, then the fluid pressure in the chamber 154 effects a locking of the wedge block assembly 132 and the piston rod 146 and roller 148 in a fixed position relative to the structure 136 of the cradle housing 24. Then when the lead screw 72 is rotated during actuation of the generating train, the ball nut 74 (which is held from rotation by its fixed connection to the non-rotatable piston 142) is moved axially. Such axial movement of the ball nut will be transmitted to the piston 142 and through structure 136 to cradle housing in either direction, depending upon the direction of rotation of the lead screw. Referring to FIG. 4, if the direction of rotation of the lead screw is such that it moves the ball nut to the left, then such movement of the ball nut is transmitted to the cradle housing through the piston head 142, and the fluid pressure in the chamber 154. Conversely, if the rotation of the lead screw 72 is such that it moves the ball nut 74 to the right, as seen in FIG. 4, then such movement of the ball nut is transmitted through piston 142, rod 146, roller 148 and wedge 132 to structure 136 and the cradle housing, as will be evident.

If the clutch 128 is engaged, then rotation of cam 130 will operate, at preselected times, to vary the effect of rotation of the lead screw 72 on movement of the cradle housing 24, as will become evident.

It will be appreciated that the structure 136 shown in FIG. 4 may be provided at any suitable location in or on the cradle housing 24 such as, for example, the position thereof indicated in FIG. 1, and, by virtue of being carried by the cradle housing 24, the cradle 26 and cutting tool 28 will move or translate bodily with movements of the cradle housing under the action of the lead screw 72, ball nut 74, wedge 132 and cam 130.

Thus, it will be seen that the ratio-change mechanism, just described, will enable machines of the present invention to cut gears or gear sections either with regular or uniform teeth, or with irregular or non-uniform teeth, if desired, depending on whether the clutch 128 is disengaged or engaged.

Accordingly, the present invention provides a gear shaping machine of considerable versatility wherein through proper design of the shape of the cam 130 and the inclined wedge surface 150, machines of the present invention may be utilized in connection with a rack-type tool 28 having either regular or uniform teeth, or irregular or non-uniform teeth thereon. The latter require a change or variation in the rate of generation to produce gear sectors having similarly shaped non-uniform teeth.

In view of the relatively heavy weight of the cradle housing 24, means may be provided to facilitate its motion under the action of lead screw 72 and nut 74. Such means may be in the form of conventional hydraulic or fluid pressure arrangements designed to exert an upward force on the housing or fluid 24 to minimize friction, as will be appreciated.

Structures for Moving Cradle Axially

As indicated above, the feed cam 101 is operatively connected through suitable structure to effect bodily movement of the cradle 26 along its axis 40 in connection with feeding the tool 28 into the work or withdrawing it therefrom at the beginning and end of the cutting cycle, as will be understood. Such structure may be of the type disclosed in the aforesaid copending application, Ser. No. 764,222 and indicated schematically in FIG. 6. For illustrative purposes, the cradle 26 is shown as being mounted on suitable bearing structure 160 engaged to the cradle housing 24, and a yoke 162 is arranged at the rear of the cradle. The feed cam 101 engages a follower roller 164 carried by a reciprocable rod 166 connected to a lever 168 pivoted about an axis 170 and including a lug 172 (see FIG. 5) extending into the yoke 162, as shown, whereby rotation of the cam 101 effects oscillation of the lever 168 about its pivotal axis 170, as is evident. The rod 166 is shown as being continuously urged to the left, in FIG. 6, by suitable means indicated schematically as spring 174, and the cam 101 is designed so as to effect a plunge type infeed of the cutting tool 28 at the beginning of the cutting cycle, and withdrawal of the tool away from the work at the completion of the cutting cycle.

The present invention also contemplates means for bodily moving the cradle 26 axially during generation so that an oversize tooth or teeth may be cut in the workpiece, as desired. An exemplary embodiment of such means is shown in FIGS. 3, 5 and 6 as being in operative driving connection with the gear 118 at the input to the generating train, and also with the yoke 162 on the cradle.

Referring to FIG. 3, this means is shown as including right angle gearing 176 drivingly connected to the shaft 126 of the variable ratio change mechanism and also drivingly connected through shafts 178, 180 and gearing 182 to tight action change gears 184, and shafts 186, 188 to a tight action cam 190. Cam 190 is shown fixed to the shaft 188 at one end, and a drag motor 192 is shown geared to the other end of that shaft.

The cam 190 is engaged by a follower 194 carried by a U-shaped bracket 196 suitably mounted in the machine for horizontal reciprocation (left to right, as viewed in FIG. 5). An adjustable actuator 198 is carried by the bracket 196.

The U-shaped bracket is shown in FIG. 5 continuously urged to the left by spring 200 so that the follower 194 is continuously urged into contact with the tight action cam 190 whereby rotation of the latter will effect a bodily reciprocation of the bracket 196 back and forth, as seen in FIG. 5. The actuator 198 is shown operating a bell crank lever structure 202 operatively connected at one end to the yoke 162 on the cradle and at the other end to a follower rod 204 slidably mounted in the machine and continuously urged upwardly into contact with the actuator as by spring 206 (see FIG. 6) acting on the bell crank lever 202. The bell crank lever 202 is mounted on a stationary axis 208 for pivotal movement thereabout, and it includes a lug 210 extending in the cradle yoke 162, and another lug 212 at the other end thereof disposed within a recess or notch 214 in the follower rod 204.

Thus, it will be seen that rotation of the tight action cam effects bodily axial movement of the cradle 26 and the tool 28 carried thereby. The actuator 198 preferably is mounted for pivoting adjustment whereby the inclination of the undersurface 216 thereof may be varied between a horizontal position (wherein there will be no movement transmitted to the cradle by the rotation of cam 190) and other positions, as desired, to effect greater or lesser cradle movements, as will be evident. Scale markings may be provided in actuator 198, as shown, to facilitate proper adjustment relative to a zero or horizontal position. The actuator 198 may be suitably mounted for bodily adjustment for example along a circular path having the axis 218 of follower roller 220 as its center when bracket 196 is in its mean position.

Means for Mounting and Reciprocating the Tool in the Cradle

The exemplary embodiment of the structures for mounting and reciprocating the cutting tool 28 in the cradle 26 are illustrated in FIGS. 3 and 7-9. As there shown, the cutting tool 28 is suitably removably connected to a cutter slide 222 slidably mounted in a housing 223. The housing 223 is pivotally mounted in an outer casing 225 by means of pivot pins 227 (see FIG. 9) defining a horizontal pivotal axis 229 for the housing 223. Casing 225 may be suitably mounted in fixed position in the outer face of the cradle 26.

Figure 7:
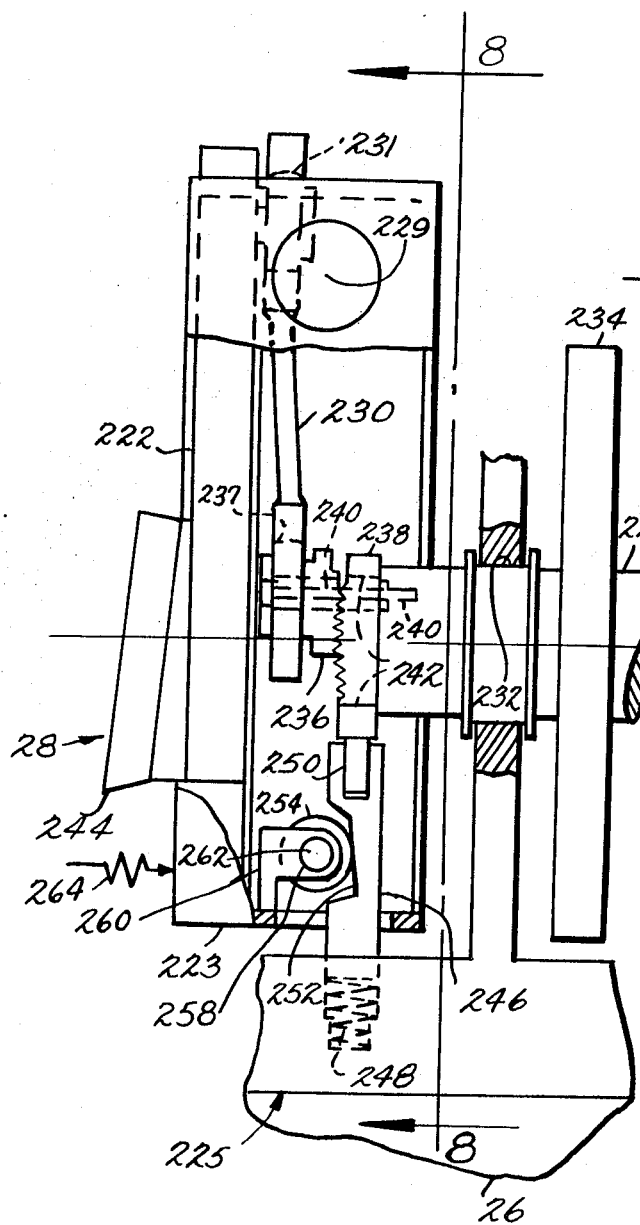
FIG. 7 is an enlarged and fragmentary side elevational view, partially broken away and sectioned, of the front of the cradle showing an exemplary mounting and driving construction for the reciprocating cutting tool.

The cutter slide 222 is reciprocated vertically by driving connection to a motor 224 (see FIG. 3). As shown, the motor 224 is connected by a belt 226 and pulleys to a drive shaft 228 journaled in the rear wall of the cradle and extending thereinto for connection to a rod 230 suitably connected to the slide 222, as by a spherical bearing, such as a ball and socket type joint 231, as shown in FIG. 7. A support and bearing structure 232 is provided for the shaft 228 within the cradle, as shown in FIG. 7, and a fly wheel 234 is mounted on the drive shaft, as indicated in that Figure. Among other things, the fly wheel 234 smoothes out the torque in the crank or connecting rod 230 drive, as will be understood.

Suitable means are provided for adjustably connecting the rod 230 to the drive shaft 228 at different eccentric points thereon to vary the stroke of the cutting tool, as desired. As shown, such structure includes a connecting member 236 attached to the rod 230 as by a spherical bearing, such as a ball and socket type joint 237. Member 236 has a serrated face in adjustable engagement with a similarly shaped serrated face provided on a relief cam 238 fixed to the shaft 228, as shown in FIG. 7. A bolt 240 is shown extending through an elongated slot 242 in cam member 238 for holding the parts in adjusted position.

Figure 8:
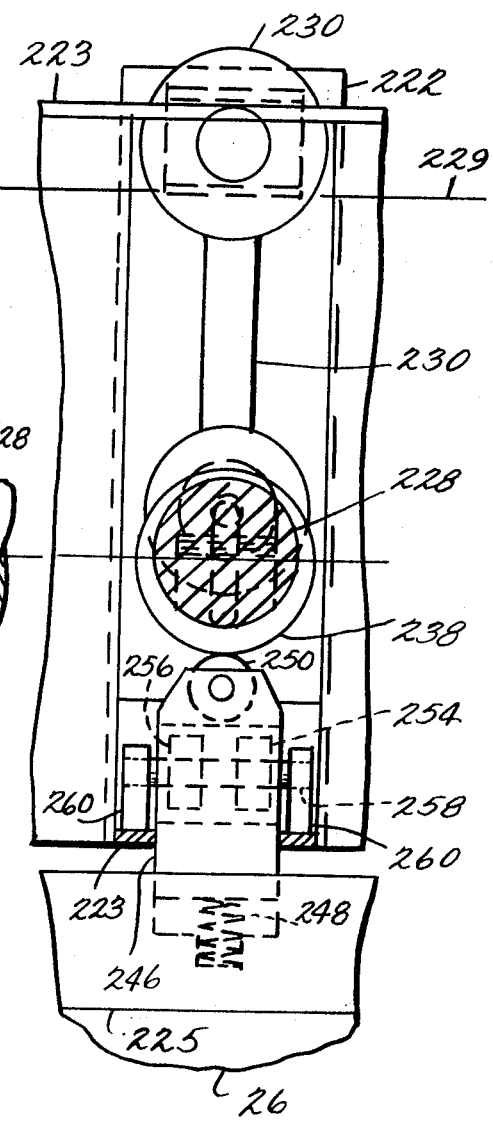
FIG. 8 is a view taken in the direction of the arrows 8—8 in FIG. 7.

It will be understood that the reciprocation of the cutting tool in the cutting stroke will require, in connection therewith, an infeed of the cutting tool at the top of its stroke and a withdrawal of the cutting tool from the work at the bottom of its stroke. The cutting action will take place only on the downward stroke of the cutting tool whereby metal will be removed by the lower cutting edges 244 of the teeth of the cutting tool. The structure shown for effecting this particular infeed and withdrawal of the cutting tool includes the relief cam 238 and a cam member 246 carried by the cradle 26 and continuously urged toward the cam 238, as by compression spring 248. This cam member 246 is shown as including a follower roller 250 engaged to the cam 238, and a cam surface 252 of suitable design formed therein and engaged to rollers 254, 256 mounted on a pin 258 journaled in brackets 260 carried by the tool housing 223 as best seen in FIGS. 7 and 8. Rollers 254, 256 are free to rotate about their stationary axis 262 so that vertical reciprocation of the cam member 246 in response to the bias of spring 248 and the particular design or shape of the relief cam 238 will effect an infeed and a withdrawal of the cutting tool relative to the work as the cam surface 252 moves back and forth across the rollers 254, 256, as will be evident. In this connection, suitable biasing means are provided for continuously urging the tool housing 223 to pivot counterclockwise about axis 229, as viewed in FIG. 7, and such means is indicated schematically as spring 264. It will be appreciated that the cam surface 252 passing over rollers 254, 256 results in a swinging or pivoting of housing 223 about the axis 229 of pivot pins 227 to effect the infeed and withdrawal of the tool, just referred to.

Figure 10:
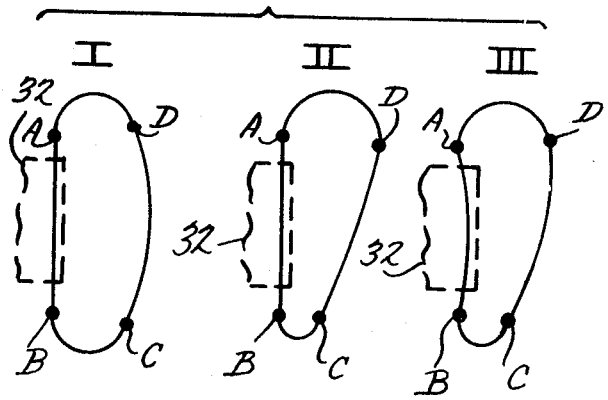
FIG. 10 is a composite view showing three different cutting motions or paths traced by a point on the cutting edge of the tool during its reciprocation.

FIG. 10 illustrates three different types of paths that may be described by a point on one of the cutting edges 244 of the tool 28, depending on the design of the relief cam 238 and cam surface 252 of cam member 246. The first motion, indicated by the Roman numeral I, shows the point on the cutting edge tracing a path wherein the cutting stroke occurs between points A and B and is vertical as it passes through the work 32 with substantially similar arcs being traced for the withdrawal from points B to C and the infeed from points D to A. The second motion shown in FIG. 10, indicated by Roman numeral II, constitutes an improved design wherein the cutting stroke between A and B is slightly curved and the withdrawal arc from B to C is of smaller radius than the infeed arc from B to A. Thus, there is less drastic motion on withdrawal and this latter cutting motion will enable the return vertical stroke from C to D to be begun at an earlier time than cutting motion I, whereby the time for each period of reciprocation of the tool may be shortened.

The cutting motion identified by Roman numeral III in FIG. 10 constitutes a still further improvement. The cutting stroke between points A and B is even more curved for producing a crowned effect on the teeth being cut. It is believed that it will also be the smoothest motion, kinematically, and provide optimum results and workpieces of superior quality.

It will be appreciated that cutting paths other than those shown in FIG. 10 can be effected by appropriate design of the cams 238 and 252.

Figure 9:
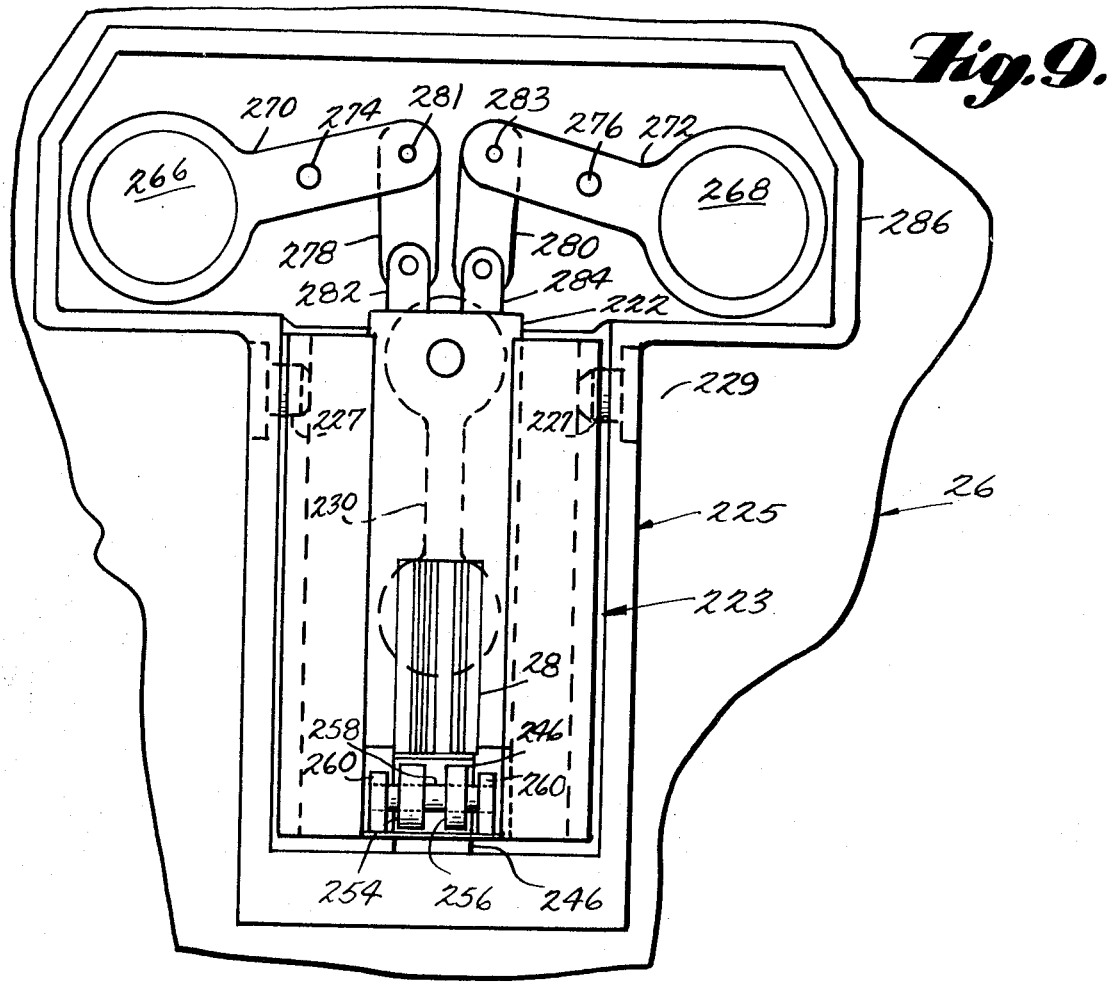
FIG. 9 is a front elevational view of the cutting tool and associated structure shown in FIG. 7 and with certain cradle structure omitted for convenience of illustration.

To further assist in enabling the cutting tool 28 to be operated at high speeds, (for example, 600 strokes per minute) counterbalancing structure is provided for the reciprocating cutter slide 222. An exemplary embodiment of this structure is shown in FIG. 9 as including similar counterbalancing weights 266, 268 carried in levers 270, 272, respectively. These levers are pivotally mounted by pins 274, 276 and connected to linkages 278, 280 as by spherical bearings 281, 283. Linkages 278, 280 are in turn pivotally connected to lugs 282, 284 fixed to the cutter slide 222. The pins 274, 276 are held stationary, as by being fixed to the sidewalls of the upper section 286 of casing 225. The spherical bearings 281, 283 allow for the rocking or pivoting movement of the housing 223 about axis 229.

The counterbalancing weights 266, 268 are designed so as to offset any possibly unbalanced condition caused by the momentum of the slide 222, and otherwise to contribute to smooth, vibration-free, and high speed operation. The flywheel 234 helps to compensate for the extra mass added by this counterbalance.

Work Head Assembly

The work head assembly 30 in the exemplary embodiment shown in FIGS. 1 and 2, is of the type disclosed in the commonly assigned copending application, Ser. No. 764,221 mentioned above. It is shown as mounted and arranged above base 22 for movements in the same manner as disclosed in that application, wherein it will be movable, in the direction of or along the cradle axis 40, between (1) a work loading and unloading position, and (2) an operative or cutting position. These two positions of the work head assembly 30 are indicated in phantom or dashed lines in FIG. 2, with an exemplary work loading and unloading position being shown on the right and an exemplary operative or cutting position being shown on the left. The work 32 is suitably mounted in the work head assembly, as disclosed in the copending application just mentioned, and the work is shown in FIG. 2 with its axis inclined at angle $a$ to the vertical for the operative or cutting position. Thus, in an exemplary machine operation, the cutter 28 reciprocates vertically while the axis of the work is disposed at a slight angle $a$ (for example, 7 – 9°) to the vertical to provide a slightly tapered tooth surface, as will be appreciated.

The means for so tilting the work head assembly 30 are shown as including the piston 288 and the cylinder 290 and may be of the same construction as disclosed in the aforesaid copending application, Ser. No. 764,221. Of course, suitable clamping means (not shown) may also be provided for releasably and securely holding the work head assembly 30 and the work against any undesirable movements during cutting so as to minimize vibration and permit high speed operations, as will be understood, and as is disclosed in the last-named copending application.

Work Loading and Unloading Turret and Conveyors

The work loading and unloading turret 34 in the exemplary embodiment of the invention is shown as being of similar construction to the work loading and unloading turret disclosed in copending application, Ser. No. 764,219, referred to above. The turret 34 is shown as including three arms, each being provided with suitable work gripping means 292, and adapted to transfer a workpiece from the infeed conveyor 36 to the work head assembly 30 for a cutting operation to be performed thereon, and also adapted to transfer work from the work head assembly 30 to the discharge conveyor 38 after a cutting operation has been performed thereon. It will be appreciated that the turret 34 operates periodically, descending downwardly from the position thereof shown in FIG. 2 to grip workpieces on the infeed conveyor 36 and work head assembly 30, after which it is elevated and then rotated through 120°. Thereafter, the turret descends so as to mount the new work in the work head assembly and to deposit work in the discharge conveyor 38, as will be understood.

The workpieces 32 are shown as including a stem or shaft 294 and a work blank section 296. As will be understood, the shaft or stem 294 is received within the work head assembly 30, for example, in a suitable chuck or collect construction provided therein for gripping the workpiece and holding it securely.

The conveyors 36, 38 in the illustrative embodiment may be of any suitable design. For illustrative purposes, they may each be provided with an endless belt 298 having longitudinally spaced perforations or apertures therein for reception of the shafts 294 of the work as indicated. These belts may be moved in intermittent or step-by-step fashion so as to successively align a new aperture or perforation with the gripping means 292 of the turret for each successive workpiece. In certain cases, it may be desired to operate the machine of the invention without any automatic feeding and discharge system, such as turret 34 and conveyors 36, 38, as will be understood.

Operation and Use

While the operation of the machine of the present invention should be evident from the foregoing description, an exemplary machine operation will now be described with reference to producing gear sections, for example, steering gear sectors, with non-uniform or irregular teeth and with an oversize central tooth.

At the start of a cutting cycle, with the work 32 arranged in the operative position thereof shown in FIG. 2, the tool 28 is infed slightly, as by action of feed cam 101, to effect a partial plunge cut. At this time, there has not yet occurred any rotation of the work or translation of the tool, as will be understood. Thus, the cutting cycle begins with a plunge feed followed by generation rather than having the cutting cycle comprising only a complete generating roll. This shortens the time of the cutting cycle, as suggested in the aforementioned copending application, Ser. No. 769,187.

After this initial plunge cut, the work spindle begins to rotate and the tool begins to translate. Both the variable ratio cam 130 and the tight action cam 190 are on dwell. After a limited amount of generation, the variable ratio cam 130 begins to insert the wedge 132 which has the effect of speeding up the translational movement of the tool by forcing some fluid out of chamber 154 and reducing its size. This occurs at about the central tooth for the gear sector 32 since that tooth is larger than the rest. At about the same time, the tight action cam 190 begins to withdraw the cradle 26 so that the tool 28 is moved slightly away from the work in the direction of the cradle axis 40, causing the central tooth to be cut slightly oversize to provide a built-in compensation for wear during use, as is understood.

After the central tooth has been cut on the workpiece, the tight action cam 190 returns the cradle to its previous position and the variable ratio cam is on a dwell so that the wedge is stationary (in its inserted position) whereby the speed of translational movement of the tool 28 returns to its previous magnitude.

At the end of the generating roll in this first direction, the face 104 on the control cam 102 reaches its return, and all units now reverse so as to begin a cutting and generating action in the reverse direction, as will be understood.

In the reverse generation, the variable ratio cam 130 and the tight action cam 190 are both on dwell until the central tooth of the work is reached. At about that time, the variable ratio cam 130 begins to effect a withdrawal of the wedge 132, and this once more effects a speeding up of the translational movement of the cradle housing 24 and tool 28, as will be evident. At the same time, the tight action cam 190 again withdraws the cradle 26 and tool 28 for cutting the central tooth slightly oversize.

After the central tooth is passed, the variable ratio cam 130 again reaches a dwell so that the translational movement of the tool returns to its previous value for the remainder of the generating roll, and the tight action cam is on a dwell so that the cradle and tool return to their initial positions.

After the return generating roll is completed, the feed cam 101 effects a withdrawal of the cradle and tool away from the work. The work 32 is removed from the work head assembly as by turret 34, and a new workpiece arranged in operative cutting position to begin a new cycle.

It will be appreciated that the workpiece 32, in the exemplary operation just described is arranged at the small angle $a$ to the vertical to provide a shape to the gear teeth which, in the case of steering sectors, permits such sectors to be moved or adjusted, during use in a motor vehicle, as the teeth wear down. In other words, this shape enables such a steering sector to be tightened or adjusted, advantageously, to keep a tight fit in its mating rack even after there has been wear. Likewise, the oversized tooth in the center of the steering sector provides a built-in compensation for wear, especially since this is the area which receives the most action during use. By providing the oversize all around the central tooth, instead of simply providing the known "Hawkins pimple," a better fit and smoother operation can be realized.

If desired, gears having uniform teeth may be produced by machines of this invention by disabling the ratio change mechanism 116 (i.e. disengaging clutch 128) and setting the tight action actuator 198 at its zero setting, as will be evident.

It will be appreciated that the machines of the present invention may be operated with manual feed of the work although the automatic mode is designed for high speed production, as will be evident.

The work blanks 32 may have been previously roughed before being arranged in the machines 20 of the present invention after which they may be semi-finished on the first direction of generating roll and finished on the return roll. Or, the blanks may be roughed out on the first generating roll and finished on the return roll, if desired. Thus, there are numerous combinations and possibilities provided by the present invention.

An exemplary cutting tool 28 is shown in FIG. 1 as including a concave pitch surface. This type of tool will be utilized for producing gears having an oversize central tooth, as in the exemplary operation, just described. It will be understood, however, to those skilled in the art, that the shape of the rack 28 may be varied, as desired, depending on the type of gear to be produced.

The various structures shown schematically in FIG. 3, such as the gearing, shafts, etc. may be arranged in any suitable location within the machine. The cutter motor 224 may be carried by the cradle housing 24 and the drive shaft 228 may be telescoping and splined to allow for the axial movement of the cradle 26 relative to the cradle housing.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

What is claimed is:

1. A gear shaping machine comprising a base member; a housing slidably arranged on said base member for motion along a first direction; a tool holder slidably arranged in said housing for motion relative to said housing and along a second direction at right angles to said first direction; a work holder rotatable about a first axis; means for mounting and reciprocating a tool in said tool holder; and generating means for effecting a generating roll between said tool holder and said work holder including means for moving said housing in said first direction and means for rotating said work holder about said first axis; and means for varying the rate of movement of said housing during said generating roll.

2. The machine as defined in claim 1 wherein said means for moving the housing includes a lead screw and nut assembly, and wherein said rate varying means comprises a slidably adjustable wedge operatively engaging said screw and nut assembly with said housing, the position of said wedge being adjustable during said generating roll.

3. The machine defined in claim 1 and further including means for moving said tool holder in said second direction during said generating roll.

4. The machine defined in claim 3 wherein said last-named means includes a rotating cam member drivingly connected to said means for effecting a generating roll, and an adjustable actuator operatively connected to said member and said tool holder so that rotation of said member will effect movement of said tool holder in said second direction.

5. The machine defined in claim 4 wherein said actuator is adjustable to a position wherein rotation of said member will not effect any movement of said tool holder.

6. The machine defined in claim 1 wherein said tool holder includes a cutter slide arranged for generally vertical reciprocation, and means for effecting a bodily infeed and withdrawal of said cutter slide relative to said work holder during reciprocation of said slide.

7. The machine defined in claim 6 and further including counterbalancing weights operatively connected to said cutter slide.

8. The machine defined in claim 6 wherein said cutter slide provides effective cutting action during motion in one direction of said generally vertical reciprocation, and wherein said last-named means also effects, consecutively, a bodily infeed, withdrawal, and infeed of said cutter slide relative to said work holder during said cutting motion.

9. The machine as defined in claim 1 wherein said tool holder includes a cutter slide arranged for generally vertical reciprocation and further wherein said first axis is disposed at a slight angle to said vertical.

10. In a machine for cutting gears in a shaping operation comprising: a work holder rotatable about a first axis; a tool holder and a tool holder supporting structure with means providing for reciprocation of a tool carried by said tool holder; generating train means operatively connecting said work holder and said tool holder supporting structure for imparting a rotary motion to said work holder and for imparting a bodily translational motion to said structure, said generating train means also effecting a predetermined ratio of generation between said structure and said work holder; a first power source and first means drivingly connecting said power source to said generating train; second means driven off said first means independently from said generating train and operatively connected to said structure to modify the translational motion of said structure effected by said generating train.

11. The machine defined in claim 10 and further including control means for said generating train operatively connected to said first means for controlling the operation of said power source, and said control means having its own separate power source.

12. The machine defined in claim 11 wherein said control means includes a differential connection between said first means and second power source for differential operation thereby.

13. The machine defined in claim 10 wherein said second means includes a lead screw and nut assembly provided for drivingly connecting said generating train to said tool holder supporting structure and further wherein said means independent of said generating train includes a wedge in operative engagement with said tool supporting structure and said screw and nut assembly, said wedge being slidable to different positions to effect a modification of the translational motion of said structure caused by rotation of said screw.

14. The structure defined in claim 10 wherein a tool in the general form of a rack is carried by said tool holder.

15. The structure defined in claim 14 wherein said tool is provided with non-uniform teeth.

16. The structure defined in claim 15 wherein said tool has a generally concave pitch surface in the direction of translational movement of said tool holder and includes a plurality of spaced tooth cavities or slots extending at right angles to said last-named direction, the central most of said slots being wider than the rest.

17. The structure defined in claim 16 wherein said first axis is disposed at a slight angle to the vertical, wherein the direction of translational movement of said tool holder is horizontal and further wherein the direction of reciprocation of the tool carried by said tool holder is generally vertical.

18. The structure defined in claim 10 including relief means for bodily moving said tool holder toward and away from said work holder during reciprocation of the tool carried by said tool holder, and tooth-modification means for withdrawing said tool holder a small distance from said work holder when said tool holder is in its translational movement so as to form a slightly oversize tooth in a workpiece mounted in said work holder.

19. The structure defined in claim 18 wherein said tooth-modification means operates independently of said relief means.

20. The structure defined in claim 18 wherein said tooth-modification means is operatively connected to said second means, whereby said withdrawal occurs in timed relation to the varying rate of translational movement of said tool holder.

* * * * *